United States Patent Office 2,816,931
Patented Dec. 17, 1957

2,816,931
OLEFIN CARBONYLATION PROCESS

Robert Y. Heisler, Fishkill, N. Y., assignor to The Texas Company, New York, N. Y., a corporation of Delaware No Drawing. Application January 26, 1956, Serial No. 561,689

3 Claims. (Cl. 260—604)

This invention relates to carbonylation, and more particularly to carbonylation of high molecular weight monoolefins with carbon monoxide and hydrogen in the presence of cobalt catalyst to obtain primarily aldehydes.

Heretofore, it has been proposed to carbonylate diolefin polymers with hydrogen and carbon monoxide to obtain normally solid resinous mixtures in batch reactors. When carbonylating to obtain compartively pure products such as $C_{13}$ aldehydes and alcohols from a $C_{12}$ olefin, $C_{19}$ aldehydes and alcohols from a $C_{18}$ olefin and the like, it has been found that the product consisted largely of alcohols instead of aldehydes. In the preparation of low molecular weight carbonylation products it has been found advantageous to use pressures above 300 atmospheres (4500 p. s. i.) in order to direct the reaction towards formation principally of aldehydes. Various schemes for continuously carbonylating olefins with carbon monoxide and hydrogen have been proposed heretofore.

Manufacture of a principally aldehydic carbonylation reaction product is of commercial value because aldehydes are more readily converted by oxidative procedures into the corresponding fatty acids than are the corresponding alcohols. Such acids are useful in soap and lubricant manufacture. Additionally such process provides a way of making in abundance aldehydes and acids which rarely occur in natural products.

Broadly, my invention is an improvement for increasing the proportion of aldehyde to alcohol in the reaction product of a process for carbonylating $C_{12}$—$C_{20}$ monoolefins in a reaction zone with carbon monoxide and hydrogen at elevated pressure and temperature in the presence of a cobalt catalyst. In the practice of my process the product formed is predominantly a $C_{13}$—$C_{21}$ aldehyde with a little of the corresponding alcohol. My improvement comprises continuously passing a mixture consisting essentially of at least one volume part of inert liquid diluent per volume part of the olefin through the reaction zone at a space velocity not substantially below 1.5 volumes of said mixture per free volume of reaction zone per hour.

The cobalt catalyst can be a solid such as a pelleted cobalt-thoria-magnesia material or finely divided cobalt. In such case one must take into account the space occupied by the catalyst in estimating the free volume of the reaction zone. Preferably, however, the catalyst used is a cobalt carbonyl soluble in the olefin charged, e. g. dicobalt octacarbonyl. Other soluble or dispersible cobalt catalysts such as cobalt naphthenate can also be used. Concentration of the preferred catalyst (as cobalt metal) can be broadly between about 0.01 and 1.0 weight percent of the liquid feed being charged, and preferably is between about 0.1 and 0.5 weight percent.

The gas used in my carbonylation process can range from roughly about ½:1 to about 2:1 volume parts of carbon monoxide per volume part of hydrogen, and preferably is of about equal volume parts of carbon monoxide and hydrogen for efficiency and economy in the practice of the invention. The flow rate of this gas is substantially in excess of that stoichiometrically necessary to obtain the corresponding aldehyde product from the olefin being reacted, and generally ranges between about 1,000 and 45,000 standard cubic feet (measured at 60° F. and one atmosphere total pressure) per 42 gallon barrel of liquid feed to the carbonylation reactor. In computing the space velocity defined above, displacement of the gas or vapors in the reactor is not considered and said space velocity is simply the quotient of the volume of liquid feed per hour divided by the free volume of the reaction vessel.

Pressure for my reaction should be at least about 200 p. s. i. g. and can be as high as 10,000 p. s. i. g., or even higher. However, the very high pressures, e. g. above 4,500 p. s. i. g. and the expensive construction needed to accommodate same, are not necessary to achieve good results using my invention. For efficiency and economy in the operation I prefer to use pressure between 2,000 and 4,000 p. s. i. g., and especially between about 2,500 and 3,500 p. s. i. g. Temperature of the operation can range broadly between about 250° and about 375° F., but, to obtain appreciable reaction rate with little danger of polymerizing aldehyde product, I find it advantageous to operate between 275° and 350° F. I prefer to operate, for highest overall conversion of olefin into products, between about 290° and about 325° F.

Dilution of the olefin with an inert diluent which is liquid under reaction conditions is necessary to obtain the full benefits of my improved operation. The diluent preferably is a hydrocarbon such as a lower alkane having 5 to 9 carbon atoms for efficiency and economy in the operation. Aromatic diluents such as toluene, or oxygenated diluents such as ethers or dioxane can also be used. The diluent need not be a pure compound but can be a mixture of substances. To obtain the preponderance of aldehyde over alcohol in the reaction product. I have found that it is necessary to use at least about one volume part of inert liquid diluent per one volume part of olefin being charged.

The diluent and olefin can be charged to the reactor as separate streams or can be mixed prior to being charged. Preferably the ratio of diluent to olefin is between 1:1 and 4:1, since, with higher ratios of diluent to olefin, the overall quantity of olefin being acted upon in given size equipment becomes quite small, and there is more recovery processing to obtain the products. Thus, such upper dilution limitation is a practical one rather than a critical one except, of course, that infinite dilution would result in no production at all.

In order to achieve the significant improvement in production of aldehyde over alcohol, it is necessary also to use a space velocity of the diluted feed mixture not substantially below about 1½ v./v./hr., and preferably the space velocity used should be between 1.5 and 2.5. The upper limit on space velocity should not be above about 3. This, too, is a practical rather than critical limitation in that overall conversion of olefin into product begins to trail off at higher space velocities and would be, of course, essentially zero at infinite space velocity.

The following examples demonstrate several ways in which my process has been used to direct the carbonylation of higher molecular weight monoolefins to obtain principally an aldehyde product, but are not to be construed as limiting the invention.

*Example 1.*—Cobalt carbonyl catalyst used in the following runs was prepared by repeatedly pressuring cobaltous carbonate in a benzene vehicle at 3,000–4,000 p. s. i. g. and about 300° F. with a gas mixture of four volume parts of carbon monoxide per volume of hydrogen until virtually no further gas uptake occurred, then separating the cobalt carbonyl crystals and drying them with a carbon monoxide containing gas. The olefin used had the following characteristics: bromine No. 37.2; carbonyl No. 28.2; hydroxyl No. 22; average molecular wt. 224; A. S. T. M. Distillation I. B. P. 430° F., 5% over at 540° F., 95% over at 642° F., E. P. 645° F. This olefin was characterized, for practical purposes, as a $C_{16}$ alpha olefin. In each of the runs below it was diluted with n-heptane and blended with the catalyst, then charged continuously up-flow with an excess of an essentially equimolecular mixture of carbon monoxide and hydrogen into the base of a vertical cylindrical reactor heated to operating temperature. Product was removed continuously from the top of the reactor. The data presented was taken after a prerun period of about 1¼ to 2 hours which was necessary to obtain on-stream conditions. Table I below summarizes pertinent data from several runs:

Table I

| Run No. | 1 | 2 | 3 | 4 |
| --- | --- | --- | --- | --- |
| Average Temperature, ° F | 325 | 325 | 324 | 325 |
| Average pressure, p. s. i. g | 3,012 | 3,000 | 3,000 | 3,009 |
| Catalyst conc. in feed, wt. percent (expressed as Co metal) | 0.33 | 0.33 | 0.33 | 0.26 |
| Approximate gas/liquid feed ratio, s. c. f./bbl | 2,250 | 2,380 | 2,440 | 6,600 |
| Volumetric ratio, diluent:olefin | 3:1 | 1:1 | 1:1 | 1:1 |
| Space velocity, v./v./hr | 1.97 | 2.02 | 0.98 | 0.49 |
| Mol. ratio aldehyde/alcohol in reaction product | 15.1:1 | 14.86:1 | 3:1 | 2.58:1 |

From the above results it can be seen that the ratio of aldehyde/alcohol in the reaction product of the runs using the higher space velocity is about five times that of the runs using the lower space velocities, and is the highest where the olefin is diluted with three parts of diluent. The choice of diluting to a ratio as high as 3:1 as against 1:1 is somewhat a matter of economics. In run 1 the proportion of olefin converted into aldehyde was about 1½ times that converted in run 2, but the total olefin converted into aldehyde was greater in run 2 because the aldehyde concentration in the feed was higher in run 2.

*Example 2.*—Similar carbonylations, except that no diluent was added, were run with a $C_{14}$–$C_{15}$ cut of propylene polymer made by polymerizing propylene with boron trifluoride-water catalyst, said cut having a boiling range of 440–509° F.; bromine No. of 80; carbonyl No. 6; hydroxyl No. 4; and molecular weight 219. When the space velocity of feed through the reactor was 1.93, the ratio of aldehyde/alcohol in the reaction product was 13.5:1; when a space velocity of 1.0 was used this ratio was 5:1; and when a space velocity of 0.5 was used this ratio was 1.9:1. In all these runs average temperature was 325° F., average pressure was 3,000 p. s. i. g., and catalyst concentration (expressed as cobalt metal) was 0.27 weight percent. Conversion of olefin to aldehyde was substantially lower in these runs than in those of Example 1.

Obviously, many modifications and variations of the invention, as hereinbefore set forth, may be made without departing from the spirit and scope thereof, and therefore only such limitations should be imposed as are indicated in the appended claims.

I claim:

1. In a process for carbonylating a $C_{12}$–$C_{20}$ mono-olefin in a reaction zone with carbon monoxide and hydrogen at elevated pressure and temperature in the presence of cobalt catalyst to form a $C_{13}$–$C_{21}$ aldehyde and the corresponding alcohol, the improvement for increasing the proportion of said aldehyde to said alcohol in the reaction product which comprises: continuously passing a mixture consisting essentially of at least one volume part of inert liquid diluent per volume part of said olefin through said reaction zone at a space velocity not substantially below about 1.5 volumes of said mixture per free volume of reaction zone per hour.

2. The process of claim 1 wherein the volumetric ratio of said diluent to said olefin in the mixture is between 1:1 and 4:1, and the space velocity used is between 1.5 and 2.5.

3. The process of claim 2 wherein the temperature used is between 290° and 325° F., the pressure used is between 500 and 4,000 p. s. i. g., and the diluent is a lower alkane having from 5 to 9 carbon atoms.

References Cited in the file of this patent

UNITED STATES PATENTS

| 2,490,283 | Shiras | Dec. 6, 1949 |
| 2,595,763 | Carlson et al. | May 6, 1952 |